March 31, 1953  J. H. COLEMAN  2,633,542
HIGH EFFICIENCY NUCLEAR ELECTROSTATIC GENERATOR
Filed June 30, 1948
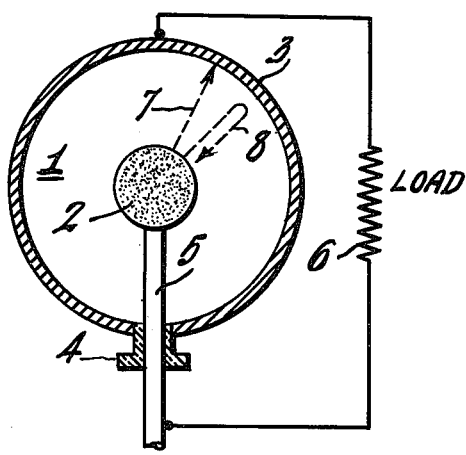
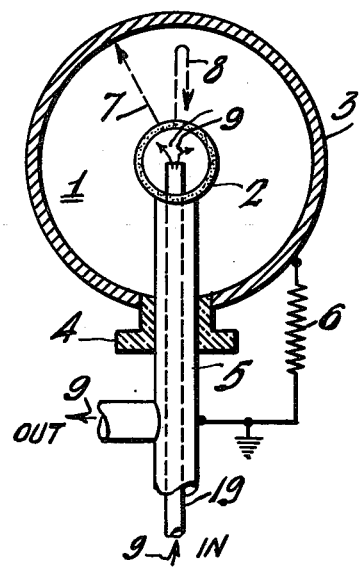
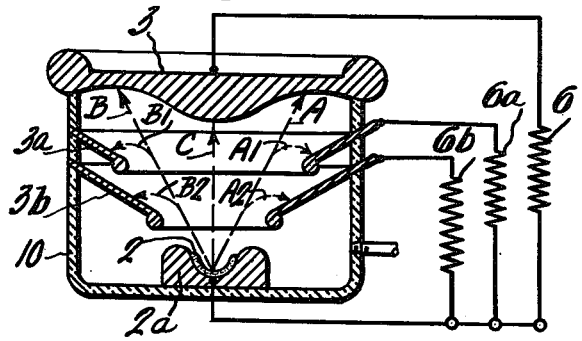
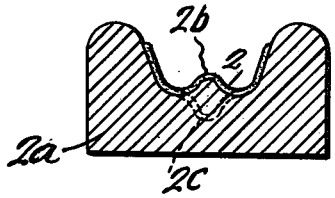
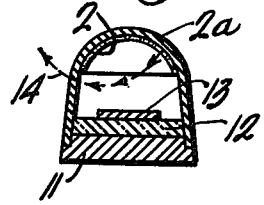
INVENTOR
John H. Coleman
BY
ATTORNEY Patented Mar. 31, 1953

2,633,542

UNITED STATES PATENT OFFICE 2,633,542

HIGH EFFICIENCY NUCLEAR ELECTROSTATIC GENERATOR

John H. Coleman, Princeton, N. J., assignor to Radio Corporation of America, a corporation of Delaware Application June 30, 1948, Serial No. 36,206

16 Claims. (Cl. 310—3)

This invention relates generally to nuclear electric generators and more particularly to unique methods of and means for deriving and utilizing the electrical energy of nuclear reactions.

The enormous magnitudes of energy provided by certain nuclear reactions of radioactive substances provide a tremendous field for the development of new sources of electrical energy. Since some radioactive radiations (energy) are largely electrical in nature, it is desirable that such electrical energy be converted directly to electrical energy of usable form. The alpha-particle and beta-particle emissions from certain radioactive substances comprise positively or negatively charged particle rays, respectively, having energies which vary from low values to several million electron volts. For example, alpha-ray emission comprises positively charged particles having energies varying from zero to the order of ten million electron volts, while beta-particle emission comprises negatively charged particles having energies varying from low values to the order of three million electron volts. Nuclear reactions are known to provide either alpha-particle emission, beta-particle emission, or a combination of alpha-particle and beta-particle emission as well as other types of charged particles not generally so well known. The direct utilization of the high electrical potentials which may be derived from such charged particles provides, in the cases in which the particle emission is charged, much more convenient and efficient utilization of nuclear energy than previously proposed systems wherein the nuclear energy is converted to thermal energy, the thermal energy converted to mechanical energy, and the mechanical energy then converted to electrical energy in a usable form. Also, the direct utilization of the electrical energy of nuclear reactions may be much more readily controlled by electrical methods than may the conversion of nuclear energy to thermal energy.

The instant invention comprises improvements on the methods and systems disclosed and claimed in copending U. S. applications Serial Number 679,081, U. S. Patent 2,517,120, granted August 1, 1950, and Serial Number 679,083, both filed June 25, 1946, which contemplate the use of collector electrodes for collecting the charged particle rays from a radioactive source, and means for applying the resultant unidirectional potential between the source and collector electrodes to a load.

One of the improvements comprising the instant invention includes providing an electrode collector system particularly responsive to charged particles that are emitted from a source at different energy levels. Another improvement comprises the providing of a new form of cathode particularly adapted to confine the emission of charged particles from a radioactive source to a defined region. Another improvement comprises a new form of cathode that increases the percentage of effective charged particles in a nuclear electric generator by electrostatically deflecting into the collecting system the charged particles that otherwise would be lost, and provides uniform potential gradients along the insulating structure.

Among the objects of the instant invention are to provide improved methods of and means for generating electrical energy in response to nuclear reactions. Another object is to provide improved methods of and means for utilizing the electrical energy in nuclear reactions for generating high unidirectional potentials. An additional object is to provide improved methods of and means for utilizing atomic energy for generating electrical energy. A still further object of the invention is to provide improved methods of and means for utilizing radioactive materials as sources of electrical energy.

Another object of the invention is to provide improved methods of and means for converting atomic energy directly to electrical energy in commercially usable forms. An additional object is to provide improved methods of and means for employing nuclear reactions to generate relatively large electrical currents.

A further object is to provide improved methods of and means for utilizing charged particle emission of nuclear reactions of radioactive materials having inhomogeneous energy distribution characteristics. A still further object is to provide improved methods of and means for utilizing charged particle emission of nuclear reactions of radioactive materials emitting the particles at different energy levels to provide a series of unidirectional potential sources. A further object is to provide improved methods and means for collecting and deflecting charged particles emitted from a radioactive source. A further object is to provide a new form of cathode that confines the emission of charged particles from a radioactive source to a defined region. A further object is to provide a new form of cathode that increases the percentage of effective charged particles emitted from a radioactive source by deflecting into a collector system the charged particles that otherwise would be lost.

The various embodiments and features of the invention will be described in detail hereinafter by reference to the accompanying drawing of which Figure 1 is a schematic diagram of the basic embodiment of the invention disclosed in said copending application and including the simple unidirectional voltage generator; Figure 2 is a schematic diagram of a modification of said basic embodiment of the invention; Figure 3 is a schematic diagram of a first embodiment of the instant invention comprising a nuclear electrical generator provided with a multi-electrode collecting arrangement one of which electrodes acts as a reflector of charged particles cathode; Figure 4 is a cross-sectional diagram of a second form of cathode; and Figure 5 is a cross-sectional diagram of a third form of cathode. Similar reference characters are applied to similar elements throughout the drawing.

Referring to the drawing, Figure 1 illustrates the simplest form of the invention disclosed in said copending application and included herein for the purpose of describing the principles and operation of the system comprising a unidirectional high voltage generator 1. The generator 1 includes a source 2 of alpha-rays or beta-rays derived from a quantity of radioactive material. A suitable alpha-ray radioactive source may comprise, for example, a quantity of polonium (Po$^{210}$) in combination with any other alpha-ray emitter having different energy characteristics. Likewise, a suitable beta-ray source may comprise a suitable quantity of radioactive phosphorus $$(15P^{32})$$

Radioactive phosphorus is a pure beta-ray emitter which becomes stable after emission. It is thus suitable for use as an electronic power source since it emits no gaseous reaction products and, therefore, it is suitable for vacuum applications.

The radioactive source 2 is surrounded, for example, by a spherical highly evacuated conductive collector electrode 3 having an aperture insulator 4 therein for a suitable insulated terminal lead 5 for the radioactive source 2. A load 6 is connected between the collector electrode 3 and the source terminal 5. If desired, the collector electrode 3 may be grounded.

In operation, and in the absence of a load, beta particles (electrons) emitted by the radioactive source 2 travel to the collector electrode 3, as indicated by the dash line arrow 7, and charge it negatively. The charge upon the collector electrode is negative with respect to the source 2 and increases until the potential of the collector electrode is sufficiently high to repel additional electrons arriving from the source 2, as shown by the dash line arrow 8. If a load is connected between the collector electrode and the source terminal, a current will flow through the load and power will be dissipated therein.

Known beta-ray emitters provide electrons having energies from almost zero to 3 million electron volts. Known alpha-ray emitters provide positively charged alpha particles having energies from about zero to the order of 10 million electron volts. If desired, an alpha-particle source may be employed instead of a beta-particle source, in which case the collector electrode 3 will be charged positively until it reaches a potential sufficiently high to repel additional alpha particles. In such a modification of the invention, the collector electrode 3 becomes the positive terminal and the radioactive source 2 the negative terminal of the generator.

The electric current produced by any source of charged particles is $$i = e\frac{dn}{dt} \quad (1)$$

where $n$ is the number of particles emitted, $t$ is the time in seconds, and therefore $dn/dt$ is the rate of particle emission, and $e$ is the electrical charge per particle. If each particle carries more than one electronic charge, $e$ must be replaced by $\mu e$ where $\mu$ is the number of charges.

For a radioactive substance $$dn/t = \lambda n \quad (2)$$

(see Pollard and Davidson, Applied Nuclear Physics, p. 105), where $\lambda$ is the decay constant and is related to the half life $t_H$ by the equation $$\lambda = \frac{0.693}{t_H} \quad (3)$$

From Equations 1, 2 and 3 it is seen that $$i = -\mu e n \frac{0.693}{t_H} \quad (4)$$

The number of atoms contained in a substance of mass M and atomic weight A is $$n = \frac{M}{m_H A} \quad (5)$$

where $m_H$ is the mass of the hydrogen atom. Thus $$i = \frac{0.693 \mu M e}{m_H A t_H} \quad (6)$$

This relation may be exressed in amperes per gram for a predetermined quantity of a radioactive substance wherein $e = 1.59 \times 10^{-19}$ coulombs, $M = 1$ gram, $m_H = 1.66 \times 10^{-24}$ grams, and $$t_H = 8.64 \times 10^4 T_H$$

where $T_H$ is the half life in days. Therefore, $$i_1 = \frac{0.76 \mu}{A t_H} \quad (7)$$

If the radioactive source is polonium, $A = 210$ and $T_H = 140$, $\mu = 2$, therefore $$i_1 = \frac{0.76 \times 2}{210 \times 140} = -51.8 \; 10^{-6} \text{ amps./gram} \quad (8)$$

$$= 51.8 \text{ microamps./gram}$$

The characteristics of the charged particle emitting substance determine not only the output voltage of the generator, but also determine its impedance. In general the available power depends upon the quantity of radioactive material employed and upon its rate of particle emission. Materials which emit at high rates have short operating life, while materials emitting at low rates have relatively longer operating lives. A. D.-C. generator of the type described has particular application for systems requiring high voltage and low power capacity since in such instances only a relatively small amount of radioactive material is required for the alpha- or beta-ray source.

For generators providing relatively large power values, cooling of the charged particle source may be necessary or desirable since the source is bombarded and heated by the returning charged particles which are reflected by the charged collector electrode. Also the collector electrode is heated by the charged particles which it collects. A simple system for cooling the charged particle emitter is shown in Figure 2 wherein the charged particle source 2 comprises a relatively thin shell of radioactive material into which air or water under pressure may be forced for cooling purposes as indicated by the arrows 9. The radioactive source terminal 5 may comprise a hollow tube forming a cooling fluid outlet and a coaxially disposed inner tube 19 forming a cooling fluid inlet. If desired, the collector electrode 3 may be cooled by air blasts.

Referring to Figure 3, a multi-electrode nuclear electric generator may be provided by mounting a source of radioactive radiations 2 in a holder 2a in regional relation to electrodes 3, 3a and 3b, which are supported in their position relative to source 2 by suitable insulating material 10, which material forms the base and sides of the generator.

The source 2 and holder 2a constitute the cathode of the generator. The holder 2a is formed from a block of metal one face of which is hollowed out into a hemisphere surface, the remainder of the face being rounded off. In the concave surface is placed the radioactive material as a thin sheet conforming to the surface of the holder.

The outer surface of collector-reflector electrode 3 may be a flat disc with rounded and increased thickness at its periphery, to reduce potential leakage. The thickness of electrode 3 varies from its center to its periphery to form a curved inner surface bulge in its central portion. Collecting electrodes 3a and 3b are disc in shape and are mounted at an angle in the insulating material 10 and protrude therethrough to form terminals for electrical connections. The inner edges of electrodes 3a and 3b are in the form of bulbous annular rings, to reduce potential leakage.

For purposes of illustration I have shown two additional potential collecting electrodes, 3a and 3b, but it will be understood that one or more such additional electrodes may be used. The shape of collector-reflector electrode 3 and the number, relative positions and widths of the additional electrodes are adjusted to the variations in the radiations characteristics of the source 2. In general, however, if more than one additional electrodes are used, the inner diameter of the electrodes closer to the source 2 are smaller than those of the electrodes farther away from the source.

When a beta emitting source is used, the negative terminals of loads 6, 6a and 6b are connected by wires to electrode 3, 3a and 3b, respectively, and the positive terminals of loads 6, 6a and 6b are connected to the cathode. If an alpha emitting source is used, the polarities of the load terminals are reversed.

It is of course apparent that only the outer electrode 3 may be used for load purposes. In such an arrangement, electrodes 3a and 3b are used as collectors only and improve the electro-potential gradient between electrode 3 and source 2.

The operation of the generator will be described as using the radioactive isotope P$^{32}$ as a source, which emits beta particles at energy levels ranging from nearly zero to 1.69 m. e. v. These particles are emitted in random directions from the surface of source 2 but in the general direction of the collecting electrodes and are somewhat displaced from but caused to travel paths generally parallel to the central axis of the generator due to the shape of the holder 2a and the electrostatic effect of it upon the emitted charged particles.

With the load 6 disconnected, the negative potential of electrode 2 is built up to a maximum, which is limited by repulsion by the negative charge of electrode 2 effectively overcoming the energy left in the beta particle as it approaches the electrode. This maximum potential is also limited by the effective resistance of the insulating material 10 separating the electrodes from the source 2.

As the potential of electrode 3 increases to a value which approaches the corresponding energy value of the lower velocity beta particles, these particles will be electrostatically deflected by electrode 3 into the collecting electrodes 3a and 3b, thus increasing the potential of these electrodes until their own potentials will effectively repel later emitted particles.

These phenomena are illustrated in Figure 3 by the dotted lines A, B and C. A and B represent the paths of sufficiently high energy particles to penetrate the electrostatic field of electrode 3. As the potential of electrode 3 builds up emitted particles of less energy will be deflected along paths A1, A2, B1 and B2 by the electrostatic field of electrode 3 until the potentials of electrodes 3a and 3b will be sufficiently high to prevent later emitted low energy particles from reaching the electrodes.

As to path C, along the axis of the generator, some particles will have enough energy to penetrate the field of electrode 3, but with no current flowing through the load, the potential of electrode 3 will rise to a point where even the highest energy particles will be repelled and particles of lower energy will be forced back toward and to the cathode. Thus the low energy particles emitted along the axis of the device will not be deflected into the low energy side electrodes 3a and 3b but will be reflected back into the cathode.

While the number of such particles reaching the cathode may be relatively small, their effect is to lower the positive potential of the cathode and therefore to lower the difference in potential between the electrodes and the cathode. To lessen their effect, I have provided, as shown in Figure 4, a cathode of the shape shown in Figure 3 except that the concave surface near the central axis is raised, as indicated at 2b, to increase the angle of support of the source material with respect to the axis of the generator. The effect of this shape is to change the direction of emission of particles in the central portion. The same effect may be produced by depressing the central portion of the cathode, as shown by dotted lines at 2c. As the raised or depressed central portion has a short radius of curvature, the optimum shape of the support is not changed materially. The shielding effect of the sides of the source are sufficient to prevent excessive field gradients around this small radius of curvature surface. Thus the cathode structure shown in Figure 4 forms a charged particle beam with a minimum of particles along the central axis of the beam and consequently improves the efficiency by collecting the low energy particles on the collector electrodes 3a and 3b instead of on the cathode 2. The radioactive particles emitted in the direction of the solid support 2a will contribute no useful energy. The structure shown in Figure 5 overcomes such loss of energy by deflecting the particles emitted in the direction of the support back in the direction of the collector electrodes. illustrated in Figure 5 in which the source material 2 is attached to the inner or outer surfaces of holder 2a in the form of a thin metal shell. .010″ berillium or .001″–.002″ aluminum sheets are suitable materials for this purpose. Support 2a is mounted on a solid metal base, which may be mounted in the center of the bottom of the generator, as shown in Figure 3. Mounted on the base 11 and inside the holder 2a is a dielectric plate 12 on which is mounted a conductor 13. The particles emitted from the inner surface of the source 2 bombard conductor 13 and thereby charge the conductor the same polarity as the charge on the bombarding particle. The conductor 13 thereafter repels such particles after they have passed out through the supporting shell 2a, as illustrated by dotted arrow 14. Some of such particles, especially those of low energy, will be absorbed or blocked by support 2a, if the source 2 is on the outer surface of the support 2a, but those of medium and high energy will penetrate the support, be deflected and pass through the support again, as shown by arrow 14, and still have sufficient energy to reach the collecting electrodes.

As an example of the increase in efficiency secured by my improvements in nuclear electric generators, it is well known that in the beta ray spectra of $P^{32}$, two-thirds of particles emitted have energies in m. e. v.'s less than one half those having maximum energies. It follows that the effect of two-thirds of the particles would be lost even if the generator were operated at one-half the potential available from the maximum energy particles.

Furthermore, some radioactive isotopes decay to other radioactive isotopes that radiate particles at different energy levels. As an example, strontium$^{90}$ in decaying to yttreum$^{90}$ emits beta particles at 0.6 m. e. v. The residual yttreum$^{90}$ is radioactive and decays to zirconium$^{90}$ emitting beta particles at 2.2 m. e. v. It follows that operating the conventional generator at only 1 m. e. v. there would be no electric generating effect from all of the strontium particles and from a large percentage, approximately 60%, of the yttreum particles.

Following is a partial list of alpha- and beta-ray emitters which are suitable for high voltage generators of the types described heretofore. Beta-ray emitters generally provide inhomogeneous energy emission. However, since alpha-ray emitters generally provide substantially homogeneous energy emission, it is desirable to combine two or more alpha-ray emitters providing different energy emission.

ALPHA-RAY EMITTERS
[Half-life]

| Element | (days) | Energy (equivalent million electron volts) |
|---|---|---|
| Polonium ($Po^{210}$) | 140 | 5.25 |
| Actinium ($Ac^{223}$) | 11.2 | 5.66 |
| Thorium X ($Th\ X^{224}$) | 3.64 | 5.65 |
| Radio actinium ($Rd\ Ac^{227}$) | 18.9 | 5.92 |

BETA-RAY EMITTERS

| Element | (days) | Energy |
|---|---|---|
| Phosphorus ($P^{32}$) | 14 | 1.7 |
| Calcium ($Ca^{45}$) | 180 | 0.2 |
| | | 0.9 |
| Scandium ($Sc^{46}$) | 85 | 0.26 |
| | | 1.5 |
| Iron ($Fe^{59}$) | 47 | 0.4 |
| | | 0.9 |
| Arsenic ($As^{74}$) | 16 | 1.3 |
| Strontium ($Sr^{89}$) | 55 | 1.5 |
| Antimony ($Sb^{124}$) | 60 | 1.53 |
| Tungsten ($W^{185}$) | 77 | 0.5 |

Thus the invention described and claimed herein comprises unique methods of and means for generating unidirectional potentials by utilizing directly the electrical properties of radioactive emission. Such generators may provide a plurality of high and low unidirectional potentials with relatively huge or low current output, respectively and are particularly adapted to utilize sources of inhomogeneous energy distribution emission.

I claim as my invention:

1. Apparatus for primarily generating electrical energy including a source of radioactive particle radiations, means disposed in a first region adjacent to said source and responsive to a portion of said radiations for establishing a first potential with respect to said source, means disposed in a second region adjacent to said source and responsive to the remainder of said radiations for establishing a second potential with respect to said source, means for applying said first potential to deflect a portion of said remainder of said radiations into said second region, and means for utilizing said potentials to provide electric currents.

2. Apparatus for primarily generating electrical energy including a source of radioactive particle radiations having inhomogeneous energy distribution characteristics, means responsive to the higher energy portion of said radiations in a first region adjacent to said source to establish a first potential with respect to said source, means disposed in a second region adjacent to said source and responsive to the lower energy radiations from said source for establishing a second potential with respect to said source, means for applying said first potential in said first region to deflect a portion of said radiations into said second region, and means for utilizing said potenials to provide electric currents.

3. Apparatus for primarily generating electrical energy including a source of radioactive particle radiations, means disposed in a first region adjacent to said source and responsive to a portion of said radiations for establishing a first potential with respect to said source, means disposed in a plurality of other regions adjacent to said source and responsive to the remainder of said radiations from said source for establishing other potentials with respect to said source, means for applying said first potential in said first region to deflect a portion of said remainder of said radiations into said plurality of other regions to establish a plurality of other potentials with respect to said source, and means for utilizing said potentials to provide electric currents.

4. Apparatus for primarily generating electrical energy including a source of radioactive particle radiations having inhomogeneous energy distribution characteristics, means disposed in a first region adjacent to said source and responsive to the higher energy portion of said radiations to establish a first potential with respect to said source, means disposed in a plurality of other regions adjacent to said source and responsive to the lower energy portion of said radiations to establish other potentials with respect to said source, means for applying said first potential in the higher energy region to deflect a portion of said higher and said lower energy portions of said radiations into said plurality of regions to establish a plurality of other potentials with respect to said source, and means for utilizing said potentials to provide electric currents.

5. Apparatus for primarily generating electrical energy including a source of radioactive material providing charged particle emission, means disposed in a region adjacent to said source responsive to a least a portion of said charged particle emission for establishing a potential with respect to said source, a second means disposed in a second region adjacent to said source responsive to at least a portion of said charged particle emission for establishing a potential with respect to said source, the first said means being disposed adjacent to said second means for exerting its said potential on at least a portion of said charged particle emission to deflect this last mentioned portion into the said second region, for establishing an increased potential therein with respect to said source and said second means, and means for utilizing said potentials.

6. Apparatus for primarily generating electrical energy including a source of radioactive material providing charged particle emission, means disposed in a region adjacent to said source responsive to at least a portion of said charged particle emission for establishing a potential with respect to said source, a plurality of second means disposed in a plurality of second regions adjacent to said source responsive to at least a portion of said charged particle emission for establishing potentials with respect to said source, the first said means being disposed adjacent to said plurality of second means for exerting its said potential on at least a portion of said charged particle emission to deflect this last-mentioned portion into the said plurality of second regions for establishing increased potentials therein with respect to said source and said plurality of second means, and means for utilizing said potentials.

7. Apparatus for primarily generating electrical energy including a source of radioactive material providing charged particle emission, means for mounting said material providing for controlled directional particle emission, means disposed in a region adjacent to said source responsive to at least a portion of said charged particle emission for establishing a potential with respect to said source, a second means disposed in a second region adjacent to said source responsive to at least a portion of said charged particle emission for establishing a potential with respect to said source, the first said means being disposed adjacent to said second means for exerting its said potential on at least said portion of said charged particle emission to deflect this last-mentioned portion into the said second region, for establishing an increased potential therein with respect to said source and said second means, and means for utilizing said potentials.

8. Apparatus for primarily generating electrical energy including a source of radioactive material providing charged particle emission, the said source being mounted in an emission transparent support, means adjacent said support for deflecting the emission passing through said support providing for controlled direction particle emission, means disposed in a region adjacent to said source responsive to at least a portion of said charged particle emission for establishing a potential with respect to said source, a second means disposed in a second region adjacent to said source responsive to at least a portion of said charged particle emission for establishing a potential with respect to said source, the first said means being disposed adjacent to said second means for exerting its said potential on at least said portion of said charged particle emission to deflect this last-mentioned portion into the said second region, for establishing an increased potential therein with respect to said source and said second means, and means for utilizing said potentials.

9. Apparatus for primarily generating electrical energy including a source of radioactive material providing charged particle emission, the said source being mounted on an emission transparent support, means adjacent said support for deflecting the emission passing through said support providing for controlled directional particle emission, the deflecting force being generated by a portion of said emission passing through said support charging said deflecting means, means disposed in a region adjacent to said source responsive to at least a portion of said charged particle emission for establishing a potential with respect to said source, a second means disposed in a second region adjacent to said source responsive to at least a portion of said charged particle emission for establishing a potential with respect to said source, the first said means being disposed adjacent to said second means for exerting its said potential on at least said portion of said charged particle emission to deflect this last-mentioned portion into the said second region, for establishing an increased potential therein with respect to said source and said second means, and means for utilizing said potentials.

10. Apparatus for primarily generating electrical energy including a source of radioactive material providing charged particle emission, the said source being mounted in a concave metal support providing for controlled directional particle emission, means disposed in a region adjacent to said source responsive to at least a portion of said charged particle emission for establishing a potential with respect to said source, a second means disposed in a second region adjacent to said source responsive to at least a portion of said charged particle emission for establishing a potential with respect to said source, the first said means being disposed adjacent to said second means for exerting its said potential on at least said portion of said charged particle emission to deflect this last-mentioned portion into the said second region, for establishing an increased potential therein with respect to said source and said second means, and means for utilizing said potentials.

11. Apparatus for primarily generating electrical energy including a source of radioactive material providing charged particle emission, the said source being mounted in a concave metal support providing for controlled directional particle emission the central portion of which has shorter radii of curvature than the radii of curvature of the outer portions, means disposed in a region adjacent to said source responsive to at least a portion of said charged particle emission for establishing a potential with respect to said source, a second means disposed in a second region adjacent to said source responsive to at least a portion of said charged particle emission for establishing a potential with respect to said source, the first said means being disposed adjacent to said second means for exerting its said potential on at least said portion of said charged particle emission to deflect this last-mentioned portion into the said second region, for establishing an increased potential therein with respect to said source and said second means, and means for utilizing said potentials.

12. Apparatus for primarily generating electrical energy including a source of radioactive material providing charged particle emission, the said source being mounted in a concave metal support providing for controlled directional particle emission the central portion of which has varying radii or curvature, means disposed in a region adjacent to said source responsive to at least a portion of said charged particle emission for establishing a potential with respect to said source, a second means disposed in a second region adjacent to said source responsive to at least a portion of said charged particle emission for establishing a potential with respect to said source, the first said means being disposed adjacent to said second means for exerting its said potential on at least said portion of said charged particle emission to deflect this last-mentioned portion into the said second region, for establishing an increased potential therein with respect to said source and said second means, and means for utilizing said potentials.

13. Apparatus for primarily generating electrical energy including a source of radioactive material providing charged particle emission, means disposed in a region adjacent to said source responsive to at least a portion of said charged particle emission for establishing a potential with respect to said source the central portion of said means exposed to said emission being closer to said source than the outer portions thereof, a second means disposed in a second region adjacent to said source responsive to at least a portion of said charged particle emission for establishing a potential with respect to said source, the first said means being disposed adjacent to said second means for exerting its said potential on at least said portion of said charged particle emission to deflect this last-mentioned portion into the said second region, for establishing an increased potential therein with respect to said source and said second means, and means for utilizing said potentials.

14. Apparatus for primarily generating electrical energy including a source of radioactive material providing charged particle emission, means disposed in a region adjacent to said source responsive to at least a portion of said charged particle emission for establishing a potential with respect to said source, the central portion of said means exposed to said emission being convex and extending closer to said source than the outer portions thereof, a second means disposed in a second region adjacent to said source responsive to at least a portion of said charged particle emission for establishing a potential with respect to said source, the first said means being disposed adjacent to said second means for exerting its said potential on at least said portion of said charged particle emission to deflect this last-mentioned portion into the said second region, for establishing an increased potential therein with respect to said source and said second means, and means for utilizing said potentials.

15. Apparatus for primarily generating electrical energy including a source of radioactive material an inhomogeneous energy distribution charged particle emission, means disposed in a region adjacent to said source responsive to the higher energy portion of said emission for establishing a potential with respect to said source, means disposed in a region adjacent to said source responsive to the lower energy portion of said emission for establishing a potential with respect to said source, the said higher energy responsive means being disposed adjacent the lower energy responsive means for exerting its potential on the lower energy emission to deflect the lower energy emission into said lower energy responsive means for establishing increased potential thereon with respect to said source, and means for utilizing said potentials.

16. Apparatus for primarily generating electrical energy including a source of radioactive material providing an inhomogeneous energy distribution charged particle emission, means disposed in a region adjacent to said source responsive to the higher energy portion of said emission for establishing a potential with respect to said source, a plurality of second means disposed in a region adjacent to said source responsive to the lower energy portion of said emission for establishing potentials with respect to said source, the said higher energy responsive means being disposed adjacent the lower energy responsive means for exerting its potential on the lower energy emission to deflect the lower energy emission into said plurality of second lower energy responsive means for establishing increased potentials thereon with respect to said source, and means for utilizing said potentials.

JOHN H. COLEMAN.

REFERENCES CITED

The following references are of record in the file of this patent:

UNITED STATES PATENTS

| Number | Name | Date |
|---|---|---|
| 770,233 | Hewitt | Sept. 13, 1904 |
| 1,523,013 | Greenslade | Jan. 13, 1925 |
| 1,748,386 | Loewe | Feb. 25, 1930 |
| 2,408,230 | Shoup | Sept. 24, 1946 |
| 2,445,305 | Hochgesang | July 13, 1948 |

FOREIGN PATENTS

| Number | Country | Date |
|---|---|---|
| 34,479 | France | Jan. 26, 1929 |

OTHER REFERENCES

"A New Electronic Battery," The Electrician, October 31, 1924, page 497.